UNITED STATES PATENT OFFICE 2,590,833

PROCESS FOR PRODUCING ALUMINA HYDRATE SOLS

Max Fredrick Bechtold, Kennett Square, Pa., and Henry Moroni Stark, Wilmington, Del., assignors to E. I. du Pont de Nemours & Company, Wilmington, Del., a corporation of Delaware No Drawing. Application May 20, 1948, Serial No. 28,277

9 Claims. (Cl. 252—313)

This invention relates to the production of colloidal solutions of alumina hydrate and more particularly to the production of colloidal solutions of alumina hydrate possessing superior film-forming properties and having many characteristics resembling those of a polymeric substance.

The preparation of alumina hydrate by the addition of ammonium hydroxide to a water-soluble aluminum salt of a monobasic acid is well known. A process has been described for the preparation of colloidal alumina hydrate which involves precipitation of alumina hydrate as noted above, washing the precipitate with water to remove soluble salts, peptizing with a strong acid such as hydrochloric acid and heating. This process has the disadvantage that the colloidal alumina hydrate formed has a high anion content, which results in degradation of acid-sensitive materials to which it may be applied. As a film-forming agent the colloidal alumina hydrate has increased water sensitivity, and reduced adhesion when used on glass surfaces and produces increased corrosion when applied as a film on metal surfaces.

This invention has as an object an improvement in the properties of colloidal alumina hydrate solutions. A further object is the preparation of stable, film-forming alumina hydrate solutions. Another object is the preparation of alumina hydrate films of improved properties. Other objects will appear hereinafter.

These objects are accomplished by the following invention wherein a water-soluble aluminum salt of a monobasic acid, preferably inorganic, is reacted in aqueous solution with a water-soluble base, preferably inorganic, the precipitated alumina hydrate collected on a filter, and washed until the free anion content in the precipitate is from 1 to 5% by weight of the anion of the aluminum salt initially employed, a suspension formed by agitation of the filter cake and heated at 60 to 95° C. for from one to four hours, higher temperatures being employed for shorter times, to cause peptization, and the resulting sol then subjected to a high-rate shearing action. The stable sol so formed is characterized by advantageously low anion content and superior film-forming properties in that the films formed therefrom after drying are clear, transparent, and resistant to cracking, peeling and flaking.

In a preferred procedure, aluminum chloride solution containing about 70 grams of $AlCl_3.6H_2O$ (equivalent to 14 grams $Al_2O_3$) per liter is poured into ammonium hydroxide solution (containing 9 to 10% by weight $NH_3$) at room temperature and the suspension is adjusted to a pH of about 8 by the addition of more ammonia solution or more aluminum chloride solution as required. The suspension is filtered and the precipitate washed with water until 96–97% of the chloride ion originally present is removed. The precipitate is then formed into a suspension by agitation and heated for one to two hours at 90–95° C. The resulting colloid suspension is then passed through a machine which imparts a strong shearing action, such as a colloid mill, a turbulent flow tube or homogenizer. The colloidal solution thus formed is then centrifuged. A stable colloidal solution of alumina hydrate is thus formed which has properties superior to any of the solutions formed by other methods hitherto known.

The alumina sol produced under the above conditions is composed of positively charged particles. Light-scattering measurements on one sample indicated average particle size in the range of 30–60 millimicrons diameter. The particles are highly hydrated alumina. Evidence from X-ray diffraction indicates that both the monohydrate and trihydrate forms of aluminum oxide may be present.

In another method for preparing stable film-forming alumina sol aluminum chloride solution containing approxmiately 70 g. per liter, expressed as $AlCl_3.6H_2O$, is poured into an ammonium hydroxide solution containing 9 to 10% by weight of $NH_3$ in sufficient excess (15 to 30% above the stoichiometric amount) to give a suspension of pH 9.0–9.3. The suspension is washed with water to remove 98–99% of the chloride ion present and the washed filter cake is agitated to form a suspension, heated at 90–95° C. for two hours and colloid milled. A stable sol of pH about 6.5 and having good film-forming properties is obtained.

The following examples in which parts are by weight are illustrative of the invention.

Example I

Alumina hydrate was prepared by dissolving 400 g. $AlCl_3.6H_2O$ in 5600 cc. water and pouring the solution quickly into 1000 cc. dilute $NH_4OH$ solution containing 341 cc. concentrated NH4OH (28%). The pH of the suspension obtained in this way was 8.0. The precipitate was filtered and washed on four 10 inch Buchner funnels until 6 liters of mother liquor and wash water had been collected in the receiving flask from each funnel. The chloride content of the product indicated that 96.4% of the chloride was removed in the washing. The washed filter cake containing the remainder of the chloride was slurried to give a crude suspension and heated with stirring at 95° C. for two hours. The crude suspension became translucent in appearance during the heat treatment and took on the properties of a colloidal sol. The sol was then subjected to a strong shearing action by passing it through a colloid mill to complete the dispersion. The resulting sol contained 5.8% by weight of solids as determined by drying and igniting a sample of the liquid. It contained 4.5 g. chloride per liter, which is equivalent to 3.6% of the theoretical amount required to form AlCl3. The pH of the sol was 4.7. The sol prepared as described above was stable on standing at room temperature. Films formed by flowing the sol onto glass plates and drying, first at room temperature and then at 100° C., were smooth, transparent, and continuous.

*Example II*

Alumina hydrate was precipitated from AlCl3 solution by dissolving 100 g. AlCl3.6H2O in 1400 g. of water, cooling to 20° C., and pouring this solution quickly into 274 cc. NH4OH solution (9% NH3 by weight). The resulting suspension had a pH of 9. The temperature rose to 24° C., due to the small heat of reaction. The precipitate was filtered and washed on a 10 inch Buchner funnel until 6 liters of combined mother liquor and wash water had been collected and 98.2% of the original chloride was removed. The filter cake containing the residual 1.8% of the chloride originally present in the AlCl3 was slurried and heated at 95° C. for two hours. The heat treatment converted the alumina hydrate from an opaque suspension to a translucent sol. The colloid was then subjected to a strong shearing action by passing it several times through a colloid mill of the Travis type. The resulting dispersion contained 2.8% solids and contained 1.8% of theoretical amount of chloride ions to form AlCl3. The pH was 5.2. Dried films of thickness varying from 1 to 5 microns, formed by flowing the colloid onto glass plates and air-drying, followed by baking at 100° C., were clear, smooth, and continuous.

*Example III*

Alumina hydrate was precipitated by mixing 400 g. AlCl3.6H2O dissolved in 5600 g. of water with dilute NH4OH containing 325 cc. concentrated NH4OH. The resulting suspension showed pH of 6.7. Additional NH4OH solution (26 cc.) was added until the suspension showed pH8.0. The precipitate was washed on Buchner funnels until 97.2% of the chloride ions were removed. The filter cake was reslurried to give a crude suspension which was heated for three hours at 95° C. The resulting colloid was subjected to a strong shearing action by passing through a colloid mill. The sol thus formed was centrifuged at 2000 R. P. M. for 45 minutes.

The sol thus obtained gave excellent films when flowed onto glass plates, air-dried, and baked at 100° C.

*Example IV*

A solution of 155 g. Al(NO3)3.9H2O dissolved in 1400 cc. of water was poured into 259 cc. of ammonium hydroxide solution containing 85 cc. concentrated (28%) NH4OH to give a suspension of pH 8.1. The suspension was filtered and washed until approximately 98% of the nitrate ions originally present in the salt had been removed. The filter cake was slurried with 200 cc. of water and the suspension heated at 90-95° C. for two hours with agitation. The peptized product was then subjected to a strong shearing treatment in a colloid mill. The resulting product was a stable sol containing 2.0% solids and containing nitrate ions equivalent to about 2.0% of the original nitrate content of the aluminum sol. The sol was characterized by good film formation.

*Example V*

Aluminum sulfamate solution equivalent to 15000 cc. of 14.5% aqueous solution was neutralized by mixing with 135 cc. concentrated (28%) NH4OH solution to give a suspension of pH 8.0. The suspension was filtered and washed with water to give a volume of six liters combined mother liquor and wash water, after which the filter cake was dispersed in water and heated at 90-95° C. for two hours. The sol was then subjected to a strong shearing treatment in a colloid mill. The resulting colloid had good film-forming properties.

Although aluminum chloride is the preferred salt for use in this invention, other aluminum salts of monobasic acids can be used, e. g., aluminum nitrate, acetate, and sulfamate. The base which reacts with the aluminum salt to form the alumina hydrate is preferably ammonium hydroxide, but other bases can be used, e. g., sodium and potassium hydroxide, sodium carbonate, amines, e. g., methyl- and ethylamine.

In precipitating the alumina hydrate by reaction of the solution of the aluminum salt with the base, the aluminum salt can be either added to the base, e. g., ammonium hydroxide, or the reverse procedure can be employed. The amount of ammonium hydroxide in relation to the aluminum chloride is preferably such to give a suspension having a pH of 8, although the pH of the suspension can vary from 7 to 9.5. At a pH lower than 8, filtration is slower and for a given amount of washing the quantity of chloride ion retained by the precipitate is greater. At a pH above 8, the filtration rate increases and the quantity of chloride ion retained by the precipitate for a given amount of washing decreases. The extent of washing is governed by the amount of chloride ion desired to remain in the sol as peptizing agent. The preferred compositions after washing contain 3 to 4% by weight of the theoretical amount of chloride ions to form aluminum chloride as originally used, but compositions containing from 1 to 5% by weight of the chloride ions originally present will give colloidal dispersions having improved properties.

The heat-peptizing treatment after filtration is important. Heating at 90-95° C. for 1 to 3 hours in open vessels at atmospheric pressure has proved satisfactory. Heating at lower temperatures, e. g., at 60-90° C., for correspondingly longer times is effective. Some evaporation takes place during the heat treatment and the extent of evaporation can be controlled by appropriate measures if it is desirable to obtain a sol of prescribed concentration. Temperatures lower than 60° C., even as low as room temperature, 25° C., can be used but necessitate such long periods as to be definitely less preferred.

The shearing treatment after the heat peptizing of the colloid is an essential step in this process. It may be accomplished by any type of equipment which imparts sufficient velocity to the sol particles under the conditions that produce shearing. Thus, one type of equipment that has been used successfully is a laboratory colloid mill comprising two closely fitting conical or disk-shaped surfaces, one a stator and the other a rotor. The speed of the rotor is 8000–9000 R. P. M. with load and the peripheral speed under average load is 8800 feet/minute. The clearance between the stator and rotor is adjustable between the limits of 0.002 to 0.03 inch. Any treatment which produces the shearing action is suitable. Thus, ejection at high speeds through an orifice also produces satisfactory shearing.

The colloid mill gives a shear, i. e., a shearing stress of from 0.08 to 1.25 lbs./in$^2$. Ejection through a small orifice gives shears several hundred times greater. Higher shears can be used but without great additional advantage. Shears of the order of 0.08 lb./in$^2$ are satisfactory.

The centrifuging step has the effect of removing small amounts of coagulated or extraneous matter present after the heat-peptizing or shearing treatments. It may be omitted in most cases, as the two treatments usually are very effective in producing functional sols.

By progressive evaporation of solvent from sols produced by the above procedure, compositions containing any desired solids content can be obtained. As water is gradually removed by open evaporation of a sol containing originally about 4% solids (expressed as Al$_2$O$_3$), the product undergoes a progressive change from a fluid sol to a gel, the firmness of which depends upon the degree of dehydration. The sol becomes very viscous at concentrations of 7 to 10%, takes on a salve-like consistency in the concentration range of 10 to 15%, and above this concentration is gel-like in structure. The gels can be redispersed to the sol form by addition of water and stirring if the dehydration has not been carried above about 50% solids.

The stability of the alumina sols can be improved by subjecting them to temperature below their freezing point until frozen to a rigid solid and then thawing again to the fluid state. In this connection see Stark U. S. Patent 2,560,707.

The alumina sols of this invention can be used as binders for inorganic materials, e. g., glass, mica, tile, etc. They can be used as agents for treatment of paper to improve its wet strength, as a size for paper in making paper laminates, as a warp size for nylon and other fibers, and as an anti-snag agent for nylon hosiery. They can also be used as ingredients of water paints to improve hardness of finish, as a mordant in color photography compositions, and as agents for the fixation of dyes on paper.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of colloidal alumina hydrate solutions which comprises precipitating, with a water-soluble base, to a final pH of 7 to 9.5, hydrous alumina hydrate from an aqueous solution of an aluminum salt of a monobasic acid, washing the precipitated alumina hydrate until it contains but 1 to 5% by weight of the anion originally present in the aluminum salt, heating an aqueous slurry of the alumina hydrate containing not less than 1% and not more than 5% by weight of said hydrate of salt anion at 60–95° C. for one to four hours and subjecting the resulting sol to a shearing stress of at least 0.08 pound per square inch.

2. A process for the preparation of colloidal alumina hydrate solutions which comprises precipitating, with a water-soluble base, with a final pH of 7 to 9.5, alumina hydrate from an aqueous solution of an aluminum salt of a monobasic inorganic acid, washing the precipitated alumina hydrate until it contains but 1 to 5% by weight of the anion originally present in the aluminum salt, heating an aqueous slurry of the alumina hydrate containing not less than 1% and not more than 5% by weight of said hydrate of salt anion at 60–95° C. for one to four hours and subjecting the resulting sol to a shearing stress of at least 0.08 pound per square inch.

3. A process for the preparation of colloidal alumina hydrate solutions which comprises precipitating, with a water-soluble base, at a final pH of 7 to 9.5, alumina hydrate from an aqueous solution of an aluminum salt of a monobasic inorganic acid, washing the precipitated alumina hydrate until it contains but 1 to 5% by weight of the anion originally present in the aluminum salt, heating an aqueous slurry of the alumina hydrate containing not less than 1% and not more than 5% by weight of said hydrate of salt anion at 60–95° C. for one to four hours and colloid milling the resulting sol.

4. A process for the preparation of colloidal alumina hydrate solutions which comprises precipitating, with a water-soluble base, at a final pH of 8, alumina hydrate from an aqueous solution of an aluminum salt of a monobasic inorganic acid, washing the precipitated alumina hydrate until it contains but 3 to 4% by weight of the anion originally present in the aluminum salt, heating an aqueous slurry of the alumina hydrate containing 3–4% by weight of said hydrate of salt anion at 90–95° C. for one to three hours and colloid milling the resulting sol.

5. Process of claim 2 wherein the aluminum salt is aluminum chloride.

6. Process of claim 2 wherein the aluminum salt is aluminum nitrate.

7. Process of claim 2 wherein the aluminum salt is aluminum sulfamate.

8. A process for the preparation of colloidal alumina hydrate solutions which comprises precipitating, with a water-soluble inorganic base, to a final pH of 7 to 9.5, hydrous alumina hydrate from an aqueous solution of an aluminum salt of a monobasic acid, washing the precipitated alumina hydrate until it contains but 1 to 5% by weight of the anion originally present in the aluminum salt, heating an aqueous slurry of the alumina hydrate containing not less than 1% and not more than 5% by weight of said hydrate of salt anion at 60–95° C. for one to four hours and subjecting the resulting sol to a shearing stress of at least 0.08 pound per square inch.

9. A process for the preparation of colloidal alumina hydrate solutions which comprises precipitating with ammonia, to a final pH of 7 to 9.5, hydrous alumina hydrate from an aqueous solution of an aluminum salt of a monobasic acid, washing the precipitated alumina hydrate until it contains but 1 to 5% by weight of the anion originally present in the aluminum salt, heating an aqueous slurry of the alumina hydrate containing not less than 1% and not more than 5% by weight of said hydrate of salt anion at 60–95° C. for one to four hours and subjecting the resulting sol to a shearing stress of at least 0.08 pound per square inch.

MAX FREDRICK BECHTOLD.
HENRY MORONI STARK.

REFERENCES CITED

The following references are of record in the file of this patent:

UNITED STATES PATENTS

| Number | Name | Date |
| --- | --- | --- |
| 1,540,446 | Wilson | June 2, 1925 |
| 1,747,177 | Moberg | Feb. 18, 1930 |
| 1,848,268 | Perisel | Mar. 8, 1932 |
| 2,085,129 | Stoewener | June 29, 1937 |
| 2,406,420 | Weiser et al. | Aug. 27, 1946 |
| 2,434,204 | Feachman | Jan. 6, 1948 |